(12) United States Patent
Gallier

(10) Patent No.: US 10,266,206 B2
(45) Date of Patent: Apr. 23, 2019

(54) CHASSIS FOR LIGHT VEHICLE, AND VEHICLE PROVIDED WITH SUCH A CHASSIS

(71) Applicant: E4V, Le Mans (FR)

(72) Inventor: Jean-Louis Gallier, Landemont (FR)

( * ) Notice: Subject to any disclaimer, the term of this patent is extended or adjusted under 35 U.S.C. 154(b) by 0 days.

(21) Appl. No.: 15/562,216

(22) PCT Filed: Mar. 31, 2016

(86) PCT No.: PCT/FR2016/050731
§ 371 (c)(1),
(2) Date: Sep. 27, 2017

(87) PCT Pub. No.: WO2016/156746
PCT Pub. Date: Oct. 6, 2016

(65) Prior Publication Data
US 2018/0118265 A1    May 3, 2018

(30) Foreign Application Priority Data

Mar. 31, 2015  (FR) .................................... 15 52754

(51) Int. Cl.
| | |
|---|---|
| B62D 21/10 | (2006.01) |
| B62D 25/20 | (2006.01) |
| B62D 29/00 | (2006.01) |
| B60K 1/04 | (2019.01) |
| B60L 11/18 | (2006.01) |
| B62D 21/02 | (2006.01) |
| B62D 21/17 | (2006.01) |
| B62D 25/16 | (2006.01) |
| B62D 27/02 | (2006.01) |

(52) U.S. Cl.
CPC ............... *B62D 21/10* (2013.01); *B60K 1/04* (2013.01); *B60L 11/1851* (2013.01); *B62D 21/02* (2013.01); *B62D 21/17* (2013.01); *B62D 25/16* (2013.01); *B62D 25/20* (2013.01); *B62D 27/026* (2013.01); *B62D 29/002* (2013.01); *B62D 29/005* (2013.01)

(58) Field of Classification Search
CPC .... B62D 29/005; B62D 29/04; B62D 29/041; B62D 29/045; B62D 29/046
See application file for complete search history.

(56) References Cited

U.S. PATENT DOCUMENTS

| | | | | |
|---|---|---|---|---|
| 5,660,428 A | * | 8/1997 | Catlin | .................... B62D 21/04 269/311 |
| 9,783,233 B2 | * | 10/2017 | Brown | .................. B29C 70/086 |
| 2011/0095574 A1 | | 4/2011 | Brown | |

FOREIGN PATENT DOCUMENTS

| | | |
|---|---|---|
| DE | 102012020429 A1 | 4/2014 |
| DE | 102013010332 A1 | 6/2014 |
| FR | 2977554 A1 | 1/2013 |

* cited by examiner

*Primary Examiner* — James A Shriver, II
*Assistant Examiner* — James J Triggs
(74) *Attorney, Agent, or Firm* — Seed IP Law Group LLP

(57) ABSTRACT

A vehicle chassis includes a core of synthetic foam having an elongate shape with a length, greater than a width, defining a longitudinal direction; an upper plate, its surface substantially matching the surface of the core; and a lower plate, its surface substantially matching the surface of the core. The core is sandwiched between the upper plate and the lower plate while being rigidly connected thereto, and is reinforced by at least one metal tube arranged longitudinally over a portion of the length of the core.

19 Claims, 4 Drawing Sheets

CHASSIS FOR LIGHT VEHICLE, AND VEHICLE PROVIDED WITH SUCH A CHASSIS

Figure 1:
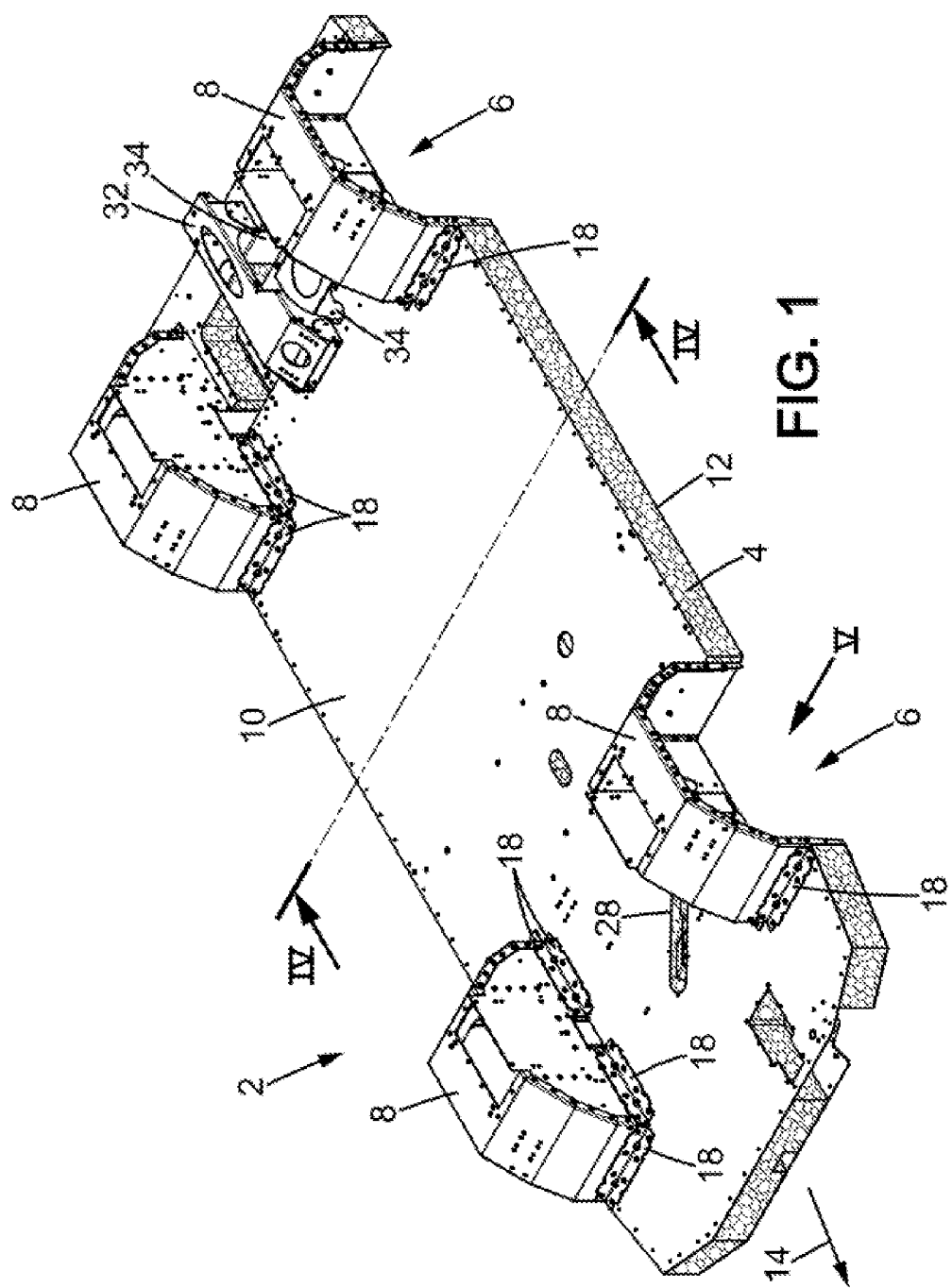

The present invention relates to a chassis for a light vehicle, and to a vehicle provided with such a chassis.

A vehicle typically has a chassis that serves as a support both for the drive means (motor or engine+transmission and wheels) and for a body arranged to receive either passengers or cargo.

The field of the invention is more particularly that of electric vehicles although it is not exclusively limited to this type of vehicle.

The mass of a vehicle is an important parameter in vehicle design. To a large extent it determines the choice of motor or engine. In an electric vehicle, the need to carry batteries is a handicap in terms of mass. In an electric vehicle, the more one wishes to increase its range, the more batteries the vehicle must carry and the heavier it is. The performance of the vehicle is then impacted. The problem is different than in a vehicle powered by a combustion engine. It is thus particularly important in an electric vehicle to limit the mass of the structure in order to increase the vehicle's range.

Document FR-2,977,554 proposes a vehicle whose weight has been reduced. The chassis of the vehicle comprises:
- a honeycomb structure forming a first plate, the longitudinal direction of the cells of said honeycomb structure being perpendicular or substantially perpendicular to the plane of said first plate so that the length of a cell defines the thickness of said first plate, the plate having on its outer free edge one recess per wheel of the vehicle, referred to as a wheel recess, a wheel being arranged in a wheel recess of said first plate,
- a second plate, referred to as the upper plate, its surface substantially matching that of the first plate, rigidly connected to the upper surface of said first plate,
- a third plate, referred to as the lower plate, its surface substantially matching that of the first plate, rigidly connected to the lower surface of said first plate,
- one resistant structure per wheel recess, referred to as the wheel well structure, projecting above said recess, surrounding the upper portion of the wheel located in said wheel recess and defining a wheel well, said resistant structure being attached to and associated with said wheel recess by a complete and rigid connection,
- an external resistant belt attached to and associated by a complete and rigid connection with the outer periphery of said first plate, at least partially arranged between said resistant structures of the wheel wells.

Such a structure allows for a lightweight chassis and also provides good mechanical strength.

However, the implementation of such a chassis requires many operations, for example the placement of the external resistant belt. One will also note that when a line, electric or otherwise, must be routed within or through the honeycomb structure, it must be protected because the edges of the honeycomb cells are sharp and therefore could damage the line.

Document US 2011/0095574 shows a chassis, preferably with a honeycomb structure, which comprises longitudinal beams extending from the upper face to the lower face of the chassis. The core of this chassis is thus separated into distinct regions.

Document DE 10 2012 020 429 shows a chassis with a sandwich structure through which it proposes running the lines within a foam core.

Document DE 10 2013 010 332 shows a sandwich structure with an upper face and a lower face each made of a fiber-reinforced composite material. The structure is laterally reinforced by longitudinal profiles.

The present invention therefore aims to provide a different type of chassis that is lightweight and mechanically resistant and easier to implement. Advantageously, the cost of the chassis will be lower than that of a chassis of the prior art.

To this end, the present invention provides a chassis for a vehicle, comprising:
- a core having an elongate shape with a length, greater than a width, defining a longitudinal direction,
- a plate referred to as the upper plate, its surface substantially matching the surface of the core, and
- a plate referred to as the lower plate, its surface substantially matching the surface of the core, the core being sandwiched between the upper plate and the lower plate while being rigidly connected to them.

According to the present invention, the core is a core of synthetic foam and is reinforced by at least one first tube arranged longitudinally over a portion of the length of the core, said first tube being fixed to a plate of the chassis and being separated from the other plate of the chassis by synthetic foam.

This novel chassis design allows simplifying the implementation of a chassis. First, it is easier to work with foam than with a honeycomb structure or other lightweight structures. Furthermore, it is unnecessary to provide a belt along the entire periphery of the device in order to close off the structure laterally. The first tube (there may be one or more others) reinforces the structure by limiting any bending of the chassis along the longitudinal axis (the longest axis and therefore most subject to bending stress), and this longitudinal direction is also advantageous for guiding the lines (electric or other) from the front to the rear—or the reverse—of the chassis.

The foam used for creating the core is for example a hard extruded polystyrene foam. Its density is for example between 30 and 60 kg/m$^3$. It is for example a foam sold by Dow under the Styrofoam trademark and known as XPS Foam.

It is preferably provided that the thickness of the synthetic foam between the other plate and the first tube corresponds to at least 25% of the thickness of the core, and more preferably at least 50%.

In such a chassis, the lower plate and upper plate are preferably metal plates (for their mechanical properties) made of a light alloy (to avoid adversely affecting the weight of the structure), for example an aluminum-based alloy.

The first reinforcing tube is made for example of the same material as the plate to which it is attached. It may be attached by gluing, welding, riveting, etc.

The upper plate and lower plate are preferably bonded to the core, for example using an epoxy adhesive.

For chassis rigidity, it is preferably provided that the longitudinally arranged first tube is integral with the lower plate. Advantageously, it is arranged in a midplane of the core. It may also be provided that a chassis as described above, again in order to optimize its rigidity, has at least one longitudinally arranged second tube, offset transversely relative to the first tube and fixed to the other plate of the chassis.

A chassis according to the invention preferably comprises four recesses created in the longitudinal sides of the chassis and opposite one another. A metal structure referred to as a wheel well can then be provided at each recess, fixed only to the upper plate and lower plate. The foam core is thus sandwiched by the wheel well attachments and then is only subjected to compression, which is advantageous for it.

In a chassis having recesses intended for accommodating wheel wells, it may be arranged that a first end of the first tube is longitudinally positioned at two opposing recesses and its other end is positioned at the two other recesses.

The upper plate may have an opening allowing access to a housing created in the core between two recesses, and the chassis may have a reinforcement longitudinally connecting one edge of the opening to an opposite edge. Advantageously, said reinforcement is provided with means for attaching a motor.

It may also be provided that a transverse groove connects two recesses and that the first tube opens onto said transverse groove. An omega profile portion can reinforce the transverse groove and advantageously have an opening at its junction with the first tube.

In a preferred embodiment, the chassis as described herein is a flat chassis, meaning that its upper plate and lower plate are planar plates.

The invention also relates to a vehicle comprising a chassis, wheels, a motor or engine, means of transmission between the motor or engine and the wheels, and a body, the chassis being a chassis as described above.

Such a vehicle is more particularly designed for a motor. The vehicle therefore preferably further comprises at least one electric battery, and the longitudinally arranged first tube receives power cables extending from the at least one battery.

Figure 2:
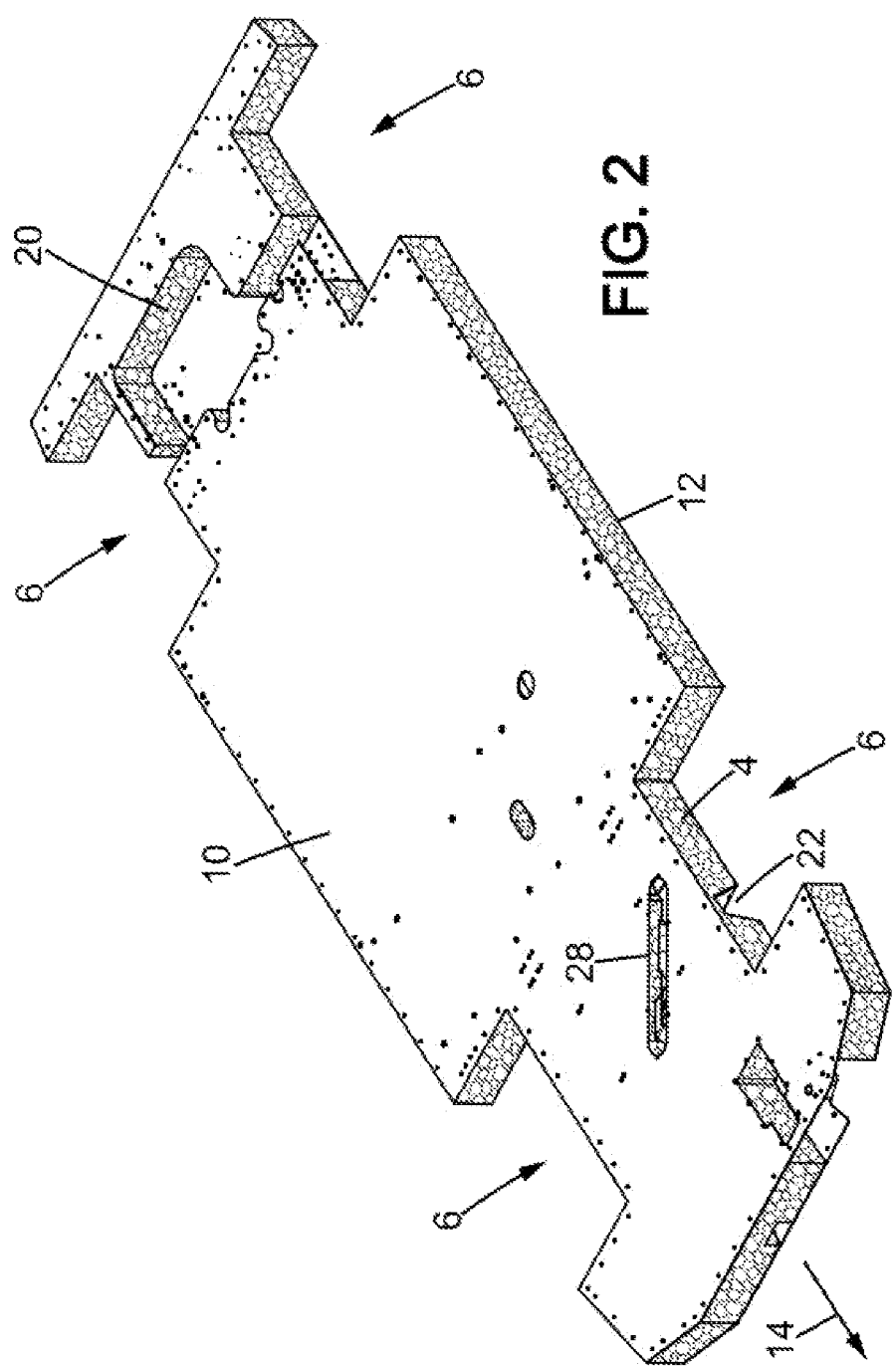
Figure 3:
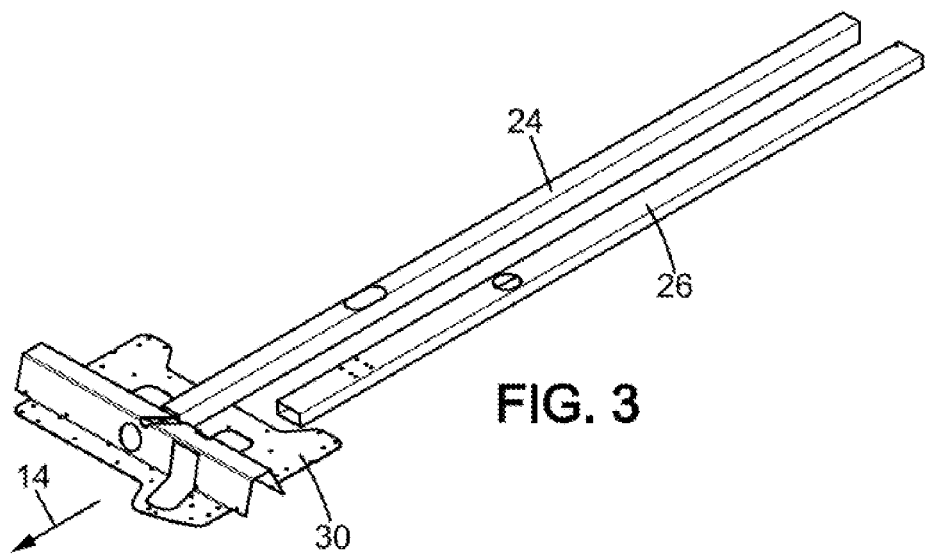
Figure 4:
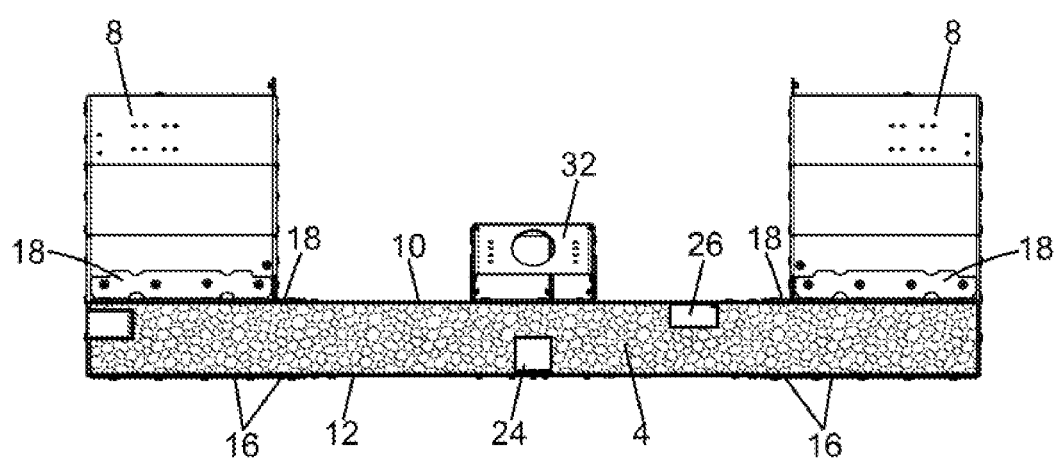
Figure 5:
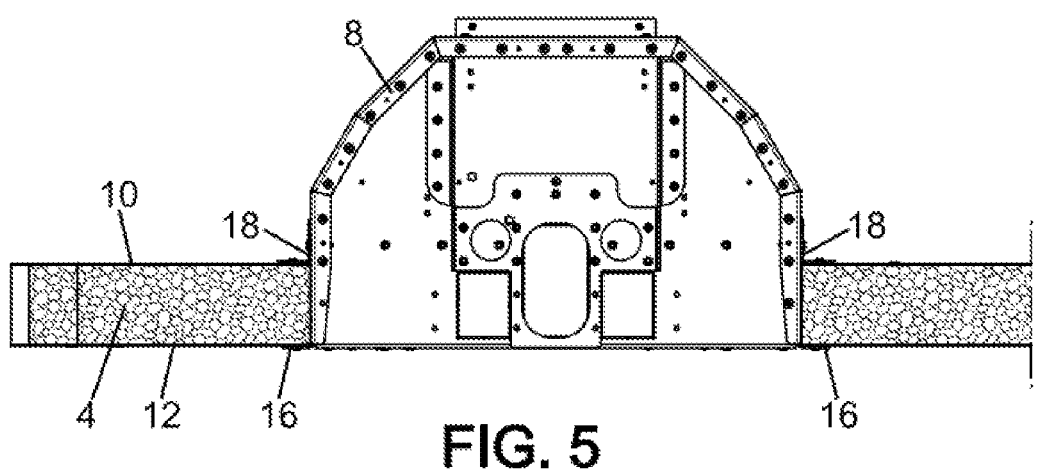

Features and advantages of the invention will be apparent from the following description, with reference to the accompanying drawings in which:

FIG. 1 is a perspective view of a chassis according to the present invention, FIG. 2 is a perspective view showing only a core of the chassis of FIG. 1, with an upper plate and a lower plate, FIG. 3 is a perspective view of metal parts arranged between the upper plate and the lower plate of the preceding figures, FIG. 4 is a cross-sectional view of the chassis of FIG. 1, and FIG. 5 is an enlarged elevational view of a wheel well illustrated in FIG. 1.

The figures illustrate an example of a bare chassis 2 specifically designed for an electric vehicle with four wheels, two front wheels for steering and two rear drive wheels. It can be used for a large number of vehicles of different finishes, serving for example as the base for vehicles for which the associated body (not shown) is designed and built according to the specific purpose of each vehicle, for example business or consumer vehicle, public transport or transport of cargo, etc. The body associated with the chassis represented is a conventional body manufactured by any known means, for example of sheet metal, and fixed for example by screwing or similar means to the chassis. The body has not been represented because it is not the object of the described invention. A skilled person is able to produce a body according to any known means and based on his or her requirements, in order to install and attach it to the chassis 2.

The bare chassis 2 shown in the figures is intended in particular for an urban electric utility vehicle for public transportation or for transport of cargo, and comprises:

a core 4 made of synthetic foam, having on its outer free edge one recess 6 per wheel of the vehicle (see FIG. 2, wheels not shown), referred to as the wheel recess 6, one wheel being arranged in one wheel recess 6 of the foam core 4. The chassis 2 has four recesses 6 each intended to receive a wheel housed in a wheel well 8 (FIG. 1).

a first plate, referred to as the upper plate 10, of which the surface substantially matches that of the core 4, rigidly connected to the upper surface of said core 2, for example by gluing.

a second plate, referred to as the lower plate 12, of which the surface substantially matches that of the core 4, rigidly connected to the lower surface of said core 4, for example by gluing.

We thus have a composite sandwich structure. Its general shape is rectangular. It naturally has a longitudinal direction 14 defined by its general shape and by the shape of the recesses 6. This longitudinal direction 14 corresponds to the longitudinal direction of the vehicle (not shown) created from the chassis 2 and is naturally apparent to the skilled person.

The core 4 is made for example of a polystyrene foam having a density per cubic meter of about 40 kg/m$^3$. Such a core is suitable for a vehicle intended to travel at speeds between 80 and 100 km/h and having a total rolling weight of approximately 3.5 tons (3.5 10$^3$ kg). The foam used for example is marketed by Dow and corresponds to Dow RTM or XPS foam. This foam provides thermal insulation and in addition provides advantageous qualities in terms of fire resistance.

The upper plate 10 and lower plate 12 here are preferably planar and continuous and made of a light metal alloy, preferably based on aluminum. A thickness of 1.5 mm (1.5 10$^{-3}$ m) may be provided for the lower plate 12 and a slightly greater thickness, for example 2 mm, for the upper plate 10 which is more subject to impacts. The alloy used here is for example 5754 aluminum alloy. The bonding of the plates to the core is preferably achieved by means of an epoxy adhesive, to form a chassis platform whose thickness in the current case for example is about 120 mm. This platform is planar. The core 4, the upper plate 10, and the lower plate 12 are cut to a predefined outline suitable for the requirements, based on the shape of the vehicle for which the chassis is intended. The platform has the substantially rectangular shape of the core 4, preferably with rounded or chamfered corners as shown. The four recesses 6, two per longitudinal side of the platform, are each rectangular here and are cut from the outer free edge of the platform to create a space for the two front wheels and the two rear wheels of the vehicle. The wheels have not been represented in order to show the interior of the wheel wells 8 which are housed in the recesses 6 and which receive the wheels. Each recess 6 is dimensioned to accommodate a wheel with its wheel well 8 as well as the transmission and/or suspension elements (shock absorber for example). The recesses intended for the front steerable wheels also allow these wheels to pivot. Preferably, the four recesses 6 may result from four identical cutouts in the platform in order to receive wheel wells 8 that are identical, at least relative to the interface that they define with the platform.

Each structure referred to as a wheel well 8 is accommodated in a recess 6 and protrudes above the recess 6 to envelop the upper portion of the wheel located in the recess 6. As shown in FIG. 5 in particular, said structure is attached to and coupled with the recess 6 by a complete and rigid connection. The wheel well 8 is formed of folded and assembled metal sheets, preferably assembled by bolting. The structure of the wheel well 8 is such that it has a lower edge 16 facing the chassis platform on the three sides of the recess 6 that define it relative to the platform. The lower edge 16 of each wheel well 8 is screwed onto the lower plate 12. Each wheel well 8 is also attached to the chassis platform by brackets 18 which are each screwed onto the upper plate 10 and onto the wheel well 8. The chassis platform is thus sandwiched at each recess 6, between the means for attaching the wheel well to the chassis platform. No other attachment is provided: thus the wheel well 8 for each wheel is attached only to the upper plate 10 and lower plate 12. Between the brackets 18 and the lower edges 16, the core 4 is in contact, or almost in contact, with the wheel well 8. No metal sheet or other protection is provided between the core 4 and the wheel well 8.

As for the structure of each wheel well 8, except for the means of attachment to the chassis platform, it can be similar to the structure described in document FR-2,977,554 (FIGS. 3 to 6 and corresponding description, particularly pages 9 to 13).

Several longitudinal and transverse edging metal sheet segments of U-shaped cross-section cover the edge and the upper and lower outer peripheral sides of the chassis platform in the areas where body elements or mechanical elements must be attached. One can for example provide an external belt (not shown) covering and following the contour of the entire periphery of the platform, possibly continuously, except along the periphery of the recesses 6 where the wheels wells 8 are located. Preferably, the U-shaped cross-section of the edging metal sheets covers the edges of the upper plate 10 and lower plate 12 and are fixed thereon, for example by riveting the free arms of the U. The external belt may be made of folded sheet metal, for example steel, of a thickness between 1 and 3 mm. It may also serve as local reinforcement to increase the overall mechanical strength of the chassis by the connection it establishes between the upper plate 10 and lower plate 12 of the platform.

In FIGS. 1 and 2 in particular, one will note the presence in the chassis platform of an upward facing pocket 20 between the two recesses 6 corresponding to the rear wheels, and of a transverse groove 22 between the recesses 6 corresponding to the front wheels of the vehicle.

The pocket 20 is made by removing material in the core 4 and by cutting the upper plate 10 to form an opening that enables introducing from above, into said pocket, a motor or engine (preferably a motor) and shafts extending transversely toward the wheel well 8 (or recesses 6).

The transverse groove 22 is created between the two recesses 6 corresponding to the front wheels of the vehicle in order to allow interconnecting the two front wheels and connecting them to a rack-type control mechanism.

In an original manner, the chassis platform is reinforced by at least one first tubular part 24 which extends longitudinally at the heart of the core 4. Preferably, the first tubular part 24 is arranged in a midplane of the chassis platform. It is preferably created of the same material (a light alloy, for example aluminum-based) as the upper plate 10 and/or the lower plate 12. This first tubular part 20 is rigidly fixed to a plate of the chassis 2, the lower plate 12 in the illustrated embodiment. Its height extends through only a portion of the thickness of the core 4. Preferably, it extends through less than 75% of the thickness of the core 4, and more preferably less than 50% of this thickness. The foam of the core 4 thus occupies space between the opposite plate, here the upper plate 10, and the first tubular part, and in this manner the core 4 ensures continuity in the transverse direction of the chassis 2. As an illustrative numerical example, if the core 4 has a thickness of 100 mm, then the tubular part 24 is for example a part having a square cross-section of 50 mm×50 mm.

FIGS. 3 and 4 illustrate the first tubular part 24. FIG. 3 is a view similar to the view of FIG. 2 but in which the core 4, the upper plate 10, and the lower plate 12 have been hidden.

The first tubular part 24 extends between the pocket 20 and the transverse groove 22. It thus extends over substantially half the total length of the chassis platform, between the recesses 6. It thus serves to reinforce the entire chassis platform and greatly reduces any bending of the structure between the wheels when the structure is under load.

The first tubular part 24 is for example rectangular in cross-section, or more particularly square in cross-section as illustrated in the accompanying figures. It creates a path for cables (or other lines) between the front and rear of the chassis platform. While in the structure described in document FR-2977554 the cables and lines run along the edge of the platform, the presence here creates a direct connection between the front and rear of the vehicle. If the batteries for powering the motor (not shown) placed in the pocket 20 are instead arranged at the front of the vehicle, the power supply cables for the motor can be arranged in the first tubular part 24. On the other hand, if the batteries are at the rear of the vehicle, for example between the recesses 6 corresponding to the rear wheels, then the first tubular part 24 can receive the electrical cables for supplying power to the dashboard of the vehicle, its front lighting, etc.

One will note in FIGS. 3 and 4 the presence of a second tubular part 26 which is also arranged longitudinally in the chassis platform, between the recesses 6 for the front wheels and those for the rear wheels.

This second tubular part 26 is also preferably made of the same material as the upper plate 10 and/or lower plate 12. It has a rectangular cross-section and is rigidly attached to the upper plate 10, while being offset with respect to a midplane of the chassis platform. This second tubular part 26 also has a reduced height in comparison to the thickness of the core 4 of the chassis 2. Its height is preferably less than 75%, and more preferably 50%, of the thickness of the core 4. Again as an illustrative numerical example, for the same core 4 which is 100 mm thick, the second tubular part 26 has for example a rectangular cross-section measuring 60 mm×40 mm, a large side of this second tubular part 26 then being fixed against the upper plate 10.

One will note in FIGS. 1 and 2 the presence of an oblong opening 28 in the upper plate 10. This oblong opening 28 allows for example the passage of a rack control rod and creates access to the front end of the second tubular part 26. The back end of the second tubular part 26 also opens onto the pocket 20. Thus, the second tubular part 26 is slightly shorter than the first tubular part 24 in the illustrated embodiment (non-limiting).

When designing the vehicle corresponding to the chassis described herein, one may for example provide that the electrical cables carrying a strong current pass through the first tubular part 24 while the electrical cables carrying a weak current are arranged in the second tubular part 26 in order to connect the front to the rear of the vehicle.

In FIG. 3 in particular, one will notice the presence of a metal part 30 resembling a Ω. This metal part 30 is intended to be fastened by the bottom to the lower plate 12, and follows the shape of the transverse groove 22 in order to house and attach a steering rack for the vehicle. This metal part 30 which extends to both sides of the transverse groove 22 allows strengthening the chassis platform which otherwise would be weakened by the transverse groove 22.

Similarly, at the pocket 20, a reinforcement and support part 32 is provided. This part forms a bridge over the pocket 20 which extends longitudinally. The motor is for example attached to this part which is attached to the chassis platform, for example by means of mounting lugs 34, in particular on the upper plate 10.

The structure proposed here is a simplified chassis structure for a light vehicle. The use of foam to create the core of the chassis platform provides extensive adaptability and greatly facilitates the design of a vehicle. It is easy to provide a housing in the platform to accommodate a mechanical element of the vehicle. When a lead must be placed in the core or alongside the core of the structure, it does not need special protection as is the case when a lead passes through a honeycomb structure.

Tubular parts (at least one) are used to create both a reinforcing structure and a passage for lines (electrical but possibly also lines for brake fluid or other fluid for example).

The use of a foam core thus does not adversely affect the rigidity of the vehicle structure.

The present invention is not limited to the preferred embodiment described above by way of non-limiting example. It also relates to all variants within the scope of a person skilled in the art in the context of the following claims.

The invention claimed is:

1. A chassis for a vehicle, comprising:
   a core having an elongate shape with a length, greater than a width, defining a longitudinal direction,
   a first plate having a surface that substantially corresponds to a first surface of the core,
   a second plate having a surface substantially corresponds to a second surface of the core, the core being sandwiched between the first plate and the second plate while being rigidly connected thereto, and the core is of synthetic foam, and
   a first tube that reinforces the core and is arranged longitudinally over a portion of the length of the core, said first tube being fixed to the first plate and being separated from the second plate by a synthetic foam portion of the core.

2. The chassis according to claim 1, wherein a thickness of the synthetic foam portion between the second plate and the first tube corresponds to at least 25% of a thickness of the core.

3. The chassis according to claim 2, wherein the thickness of the synthetic foam portion between the second plate and the first tube corresponds to at least 50% of the thickness of the core.

4. The chassis according to claim 1, wherein the first plate and second plate are metal plates made of an aluminum-based alloy.

5. The chassis according to claim 1, wherein the first tube is made of the same material as the first plate.

6. The chassis according to claim 1, wherein the upper plate and lower plate are bonded to the core.

7. The chassis according to claim 1, wherein the longitudinally arranged first tube is arranged in a midplane of the core.

8. The chassis according to claim 1, further comprising a longitudinally arranged second tube, offset transversely relative to the first tube and fixed to the second plate of the chassis.

9. The chassis according to claim 1, further comprising four recesses created in longitudinal sides of the chassis and opposite one another.

10. The chassis according to claim 9, further comprising four metal wheel wells respectively fixed at the recesses to the upper plate and to the lower plate only.

11. The chassis according to claim 9, wherein the first tube has a first end longitudinally positioned at two opposing recesses of the four recesses and a second end positioned at the two other recesses of the four recesses.

12. The chassis according to claim 9, wherein the upper plate has an opening allowing access to a housing created in the core between two recesses of the four recesses, and wherein the first tube opens onto said housing.

13. The chassis according to claim 12, further comprising a reinforcement longitudinally connecting one edge of the housing to an opposite edge of the housing.

14. The chassis according to claim 9, further comprising a transverse groove connects two recesses of the four recesses, and wherein the first tube opens onto said transverse groove.

15. The chassis according to claim 14, further comprising a reinforcing part with an omega profile portion that reinforces the transverse groove and has an opening at a junction of the reinforcing part with the first tube.

16. The chassis according to claim 1, wherein the upper plate and the lower plate are planar plates.

17. A vehicle comprising a chassis, wheels, a motor or engine, means of transmission between the motor or engine and the wheels, and a body, wherein the chassis is a chassis according to claim 1.

18. The vehicle according to claim 17, wherein the motor or engine is an electrical motor.

19. The vehicle according to claim 17, further comprising at least one electric battery, and wherein the longitudinally arranged first tube receives power cables extending from the at least one battery.

* * * * *